United States Patent
Jones

(10) Patent No.: US 6,638,612 B2
(45) Date of Patent: Oct. 28, 2003

(54) THERMOPLASTIC COMPOSITE WOOD MATERIAL

(76) Inventor: James D. Jones, 3500 Hanover Dr., Irving, TX (US) 75062

(*) Notice: Subject to any disclaimer, the term of this patent is extended or adjusted under 35 U.S.C. 154(b) by 0 days.

(21) Appl. No.: 09/955,364

(22) Filed: Sep. 18, 2001

(65) Prior Publication Data

US 2002/0034629 A1 Mar. 21, 2002

Related U.S. Application Data

(60) Provisional application No. 60/233,172, filed on Sep. 18, 2000, and provisional application No. 60/257,728, filed on Dec. 21, 2000.

(51) Int. Cl.[7] .................................................. B32B 5/16
(52) U.S. Cl. ...................... 428/323; 428/326; 428/402; 428/532; 428/535; 428/536; 428/537.1; 523/222; 521/13; 521/14; 521/53.1
(58) Field of Search ................................. 428/323, 326, 428/402, 532, 535, 536, 537.1; 523/222; 521/13, 14, 53.1

(56) References Cited

U.S. PATENT DOCUMENTS

| | | | | |
|---|---|---|---|---|
| 4,228,116 A | * | 10/1980 | Colombo et al. | 264/119 |
| 5,082,605 A | | 1/1992 | Brooks et al. | 264/40.6 |
| 5,155,146 A | * | 10/1992 | Reetz | 523/222 |
| 5,356,278 A | * | 10/1994 | Reetz | 425/111 |
| 5,417,904 A | * | 5/1995 | Razi et al. | 264/129 |
| 5,516,472 A | | 5/1996 | Laver | 264/118 |
| 5,624,616 A | * | 4/1997 | Brooks | 264/83 |
| 6,015,612 A | * | 1/2000 | Deaner et al. | 428/326 |
| 6,210,792 B1 | * | 4/2001 | Seethamraju et al. | 428/326 |

FOREIGN PATENT DOCUMENTS

| | | |
|---|---|---|
| EP | 0 292 584 A1 | 11/1988 |
| EP | 0 586 213 A1 | 3/1994 |
| GB | 1 336 007 A | 11/1973 |
| WO | WO 96 34045 A | 10/1996 |

OTHER PUBLICATIONS

*2000 Buy–Recycled Series Construction Products*, EPA530–009, Apr. 2000.

*Poisoned Playgrounds, Arsenic in "Pressure–Treated–"Wood©*, Environmental Working Group, Healthy Building Network, By: Renee Sharp and Bill Walker, Apr. 2000.

PCT International Search Report, mailed Apr. 8, 2002 (5 pages).

* cited by examiner

Primary Examiner—Leszek Kiliman
(74) Attorney, Agent, or Firm—Howison & Arnott, L.L.P.

(57) ABSTRACT

A composite material comprises a first wood component of substantially axially aligned wood chips having a first size range and being distributed throughout the composite material in a first discontinuous phase, a second wood component of wood particles having a second size range and being distributed between the wood chips in a second discontinuous phase, the second size range being distinct from the first size range and having substantially smaller values than the first size range, and a thermoplastic polymer component encapsulating the wood chips and the wood particles and forming a continuous phase extending throughout the composite material. The wood chips constitute from about 100 to about 0 weight percent of a total weight of the first and second wood components and the wood particles constitute from about 0 to about 100 weight percent of the total weight of the first and second wood components. The first and second wood components together constitute from about 90 to about 50 weight percent of the composite material. The thermoplastic polymer component constitutes from about 10 to about 50 weight percent of the composite material.

21 Claims, 8 Drawing Sheets

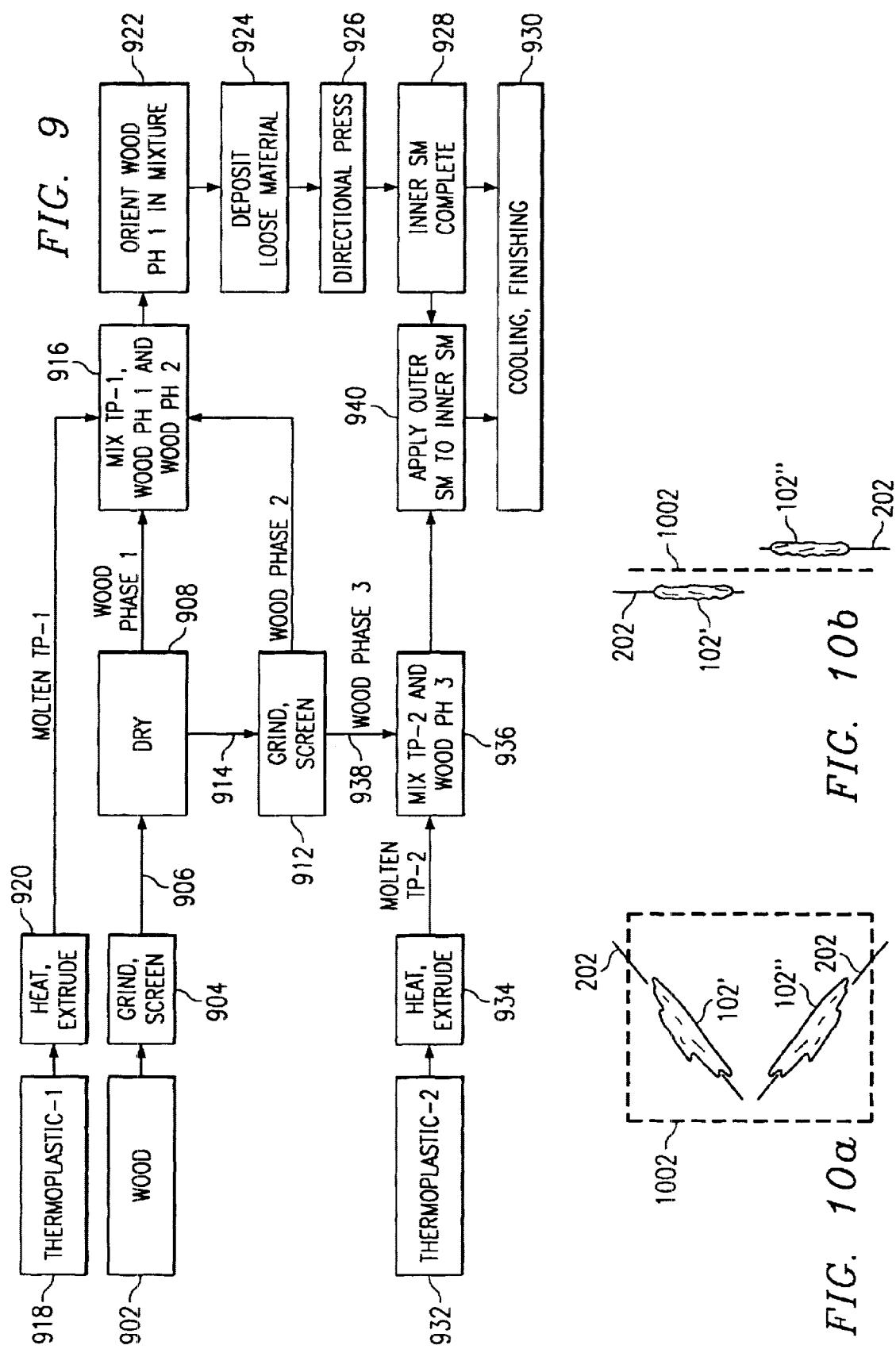

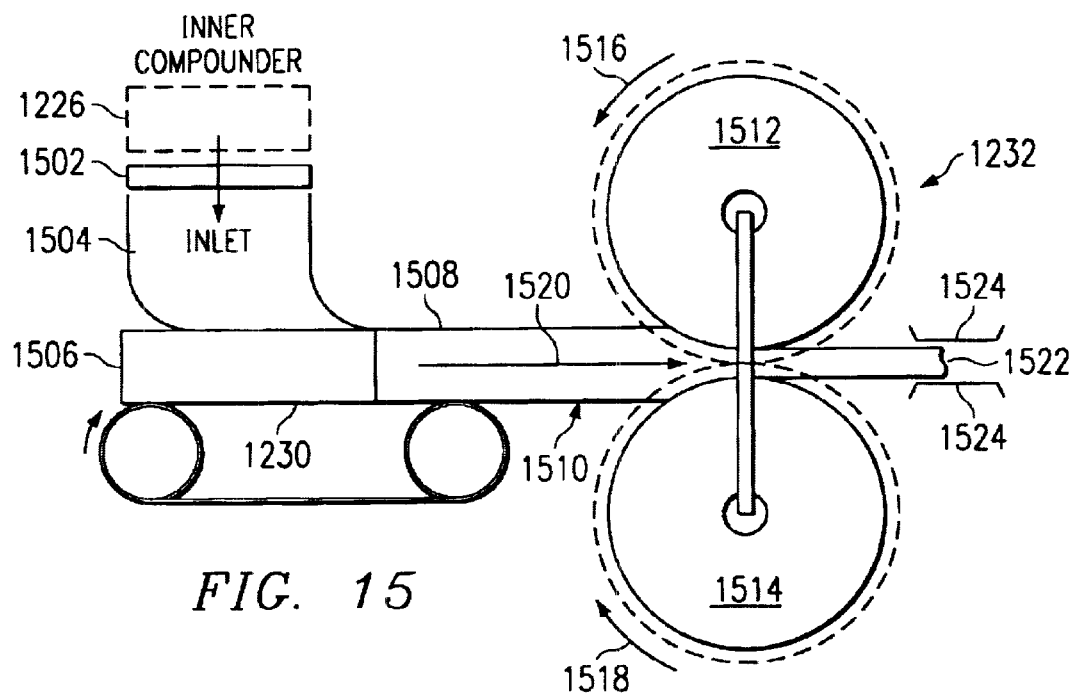
FIG. 15
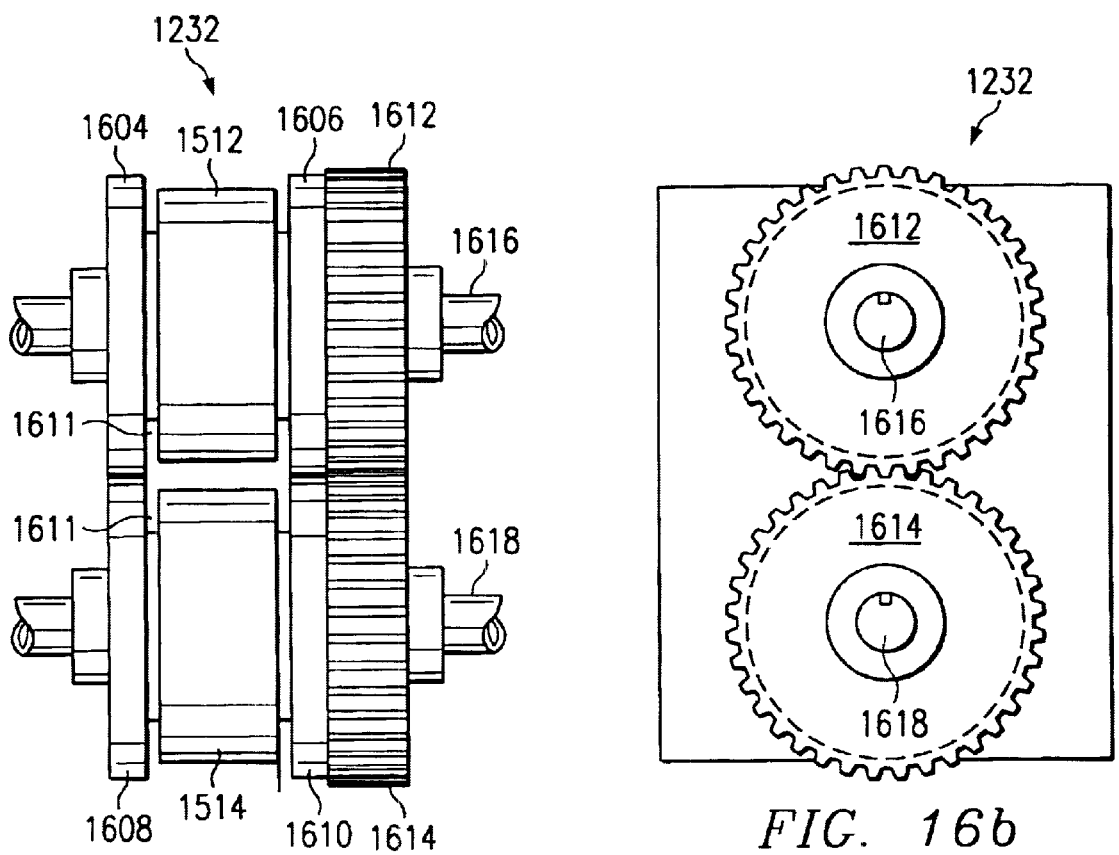
FIG. 16a
FIG. 16b

US 6,638,612 B2

THERMOPLASTIC COMPOSITE WOOD MATERIAL

CROSS-REFERENCE TO RELATED APPLICATIONS

This application is related to, and claims the benefits of priority from, U.S. Provisional Patent Application Ser. No. 60/233,172, entitled "THERMO-PLASTIC COMPOSITE WOOD", filed Sep. 18, 2000, and U.S. Provisional Patent Application Ser. No. 60/257,728, entitled "THERMO-PLASTIC COMPOSITE WOOD FOR FENCES", filed Dec. 21, 2000.

TECHNICAL FIELD OF THE INVENTION

This invention is related to a composite material comprising one or more discontinuous phases of wood particles encapsulated in a polymeric matrix, and also methods and equipment for manufacturing same. In one aspect, it relates to a composite material comprising two discontinuous wood phases having distinct size ranges encapsulated in a thermoplastic polymeric matrix.

BACKGROUND OF THE INVENTION

Composite materials consisting of natural wood fibers or particles held together with a binder substance have been widely used in the construction industry for many years and are produced on a world-wide basis. Specific examples of these composite materials, which may also be referred to as "composite wood", include: plywood, which is made from thin sheets of virgin wood fibers pressed together with a thermoset resin binder; particle board, made using finely ground virgin wood particles pressed together with a thermoset resin binder; oriented strand board, made from thin oriented virgin wood wafers pressed together with a thermoset resin binder; and medium and high density fiberboard, made from virgin wood particles pressed together with a thermoset resin binder.

More recently, a composite wood material has been produced using finely ground wood particles, also known as wood "flour", encapsulated in a thermoplastic matrix. The composite wood is essentially a thermoplastic material mixed, or "compounded", together with a wood flour filler material. The compounding of thermoplastics with filler material has been carried out for many years to modify the physical properties of thermoplastics. The compounding of thermoplastics with finely ground wood flour particles can produce a composite wood material having certain physical properties which are superior to natural wood, for example, reduced water absorption, improved resistance to chemical degradation, improved resistance to rot, and improved resistance to termites and other wood damaging insects. Due to these superior physical properties, compounded thermoplastic composite wood materials are currently used in many applications, for example, exterior door and window frames, furniture, decking, boardwalks, siding and trim materials.

While exhibiting certain desirable physical properties, compounded thermoplastic composite wood materials currently being produced typically have a density that is significantly greater than natural wood. For example, some existing thermoplastic composite wood materials have a density that is 60% greater than natural wood. Further, these materials are generally not recommended for use in load-bearing or structural applications because the thermoplastic is the primary structural component and it deforms excessively under loaded conditions. Typically, the amount of wood flour filler in the thermoplastic matrix is generally in the range of 50% by weight and the encapsulated wood particles are about 40–60 mesh (i.e., about 0.016–0.010 inch) in size. In order to reduce the overall weight of products made using these dense thermoplastic wood composite materials, the finished product design often includes thin walls with hollow spaces and structural support webs. In some cases, a foaming agent is added to the thermoplastic to reduce the density of the material. However, such foaming agents and thin-wall designs can result in a significant reduction in the impact and/or shear strength properties of the products made using these thermoplastic composite wood materials.

Notwithstanding the composite materials previously disclosed by others, their remains a need for thermoplastic composite wood materials having improved density, impact resistance, flex-modulus, compression strength, and/or shear strength properties in comparison to current materials.

A need further exists, for methods of producing thermoplastic composite wood materials having the improved characteristics described above.

A need still further exists for equipment useful in the production of thermoplastic composite wood materials, or alternately in processes where the controlled dispensing of high viscosity materials is required.

SUMMARY OF THE INVENTION

The present invention disclosed and claimed herein, in one aspect thereof comprises a composite material including a first wood component, a second wood component and a thermoplastic polymer component. The first wood component is of substantially axially aligned wood chips having a first size range and being distributed throughout the composite material in a first discontinuous phase. The second wood component is of wood particles having a second size range and being distributed between the wood chips in a second discontinuous phase, the second size range being distinct from the first size range and having substantially smaller values than the first size range. The thermoplastic polymer component encapsulates the wood chips and the wood particles and forms a continuous phase extending throughout the composite material. The wood chips constitute from about 100 to about 0 weight percent of a total weight of the first and second wood components and the wood particles constitute from about 0 to about 100 weight percent of the total weight of the first and second wood components. The first and second wood components together constitute from about 90 to about 50 weight percent of the composite material. The thermoplastic polymer component constitutes from about 10 to about 50 weight percent of the composite material.

In another aspect, the invention comprises a composite material including an inner structural member and an outer structural member. The inner structural member has a first wood component of substantially axially aligned wood chips having a first size range and being distributed throughout the inner structural member in a first discontinuous phase. A second wood component of wood particles having a second size range is distributed between the wood chips in a second discontinuous phase, the second size range being distinct from the first size range and having substantially smaller values than the first size range. A first thermoplastic polymer component encapsulates the wood chips of the first wood component and the wood particles of the second wood component and forms a first continuous phase extending throughout the first structural member. The first and second wood components together constitute from about 90 to about 50 weight percent of the inner structural member, and the first thermoplastic polymer component constitutes from about 10 to about 50 weight percent of the inner structural member. The outer structural member is continuously joined to the inner structural member. The outer structural member includes a third wood component of wood particles having a third size range and being distributed throughout the outer structural member in a third discontinuous phase. A second thermoplastic polymer component encapsulates the wood particles of the third wood component and forms a second continuous phase extending throughout the outer structural member. The third wood component constitutes from about 10 to about 50 weight percent of the outer structural member, and the second thermoplastic polymer component constitutes from about 90 to about 50 weight percent of the outer structural member.

In yet another aspect, the invention comprises a method of manufacturing a thermoplastic composite wood material comprising an inner structural member including substantially axially aligned wood chips having a first size range, a second wood component of wood particles having a second size range, and a first thermoplastic polymer component encapsulating the wood chips and the wood particles and forming a first continuous phase extending throughout the first structural member. The method includes the step of mixing together a first quantity of a first wood component of wood chips having long axes and a first size range, a second quantity of a second wood component of wood particles having a second size range distinct from the first size range, and a third quantity of a first thermoplastic polymer component of molten thermoplastic polymer until substantially all of the wood chips and the wood particles are encapsulated by the thermoplastic polymer. It further includes the step of orienting the long axes of the wood chips of the first wood component such that they are substantially parallel to a predetermined plane. It further includes the step of depositing a loose material constituting a mixture of the wood chips encapsulated in the thermoplastic polymer and the wood particles encapsulated in the thermoplastic polymer onto a press inlet conveyor unit while maintaining the orientation of the long axes of the wood chips. It further includes the step of pressing the loose material in a direction substantially parallel to the predetermined plane such that it is compacted and such that the long axes of the wood chips are oriented substantially parallel to one another.

In still another aspect, the invention comprises a method of manufacturing a thermoplastic composite wood material comprising an inner structural member and an outer structural member, where the inner structural member includes a first wood component of substantially axially aligned wood chips having a first size range and being distributed throughout the inner structural member in a first discontinuous phase, where the inner structural member also includes a second wood component of wood particles having a second size range and being distributed between the wood chips in a second discontinuous phase, and where the inner structural member also includes a first thermoplastic component encapsulating the wood chips and the wood particles and forming a first continuous phase extending throughout the inner structural member, and further where the outer structural member is continuously joined to the inner structural member and includes a third wood component of wood particles having a third size range and a second thermoplastic component encapsulating the wood particles of the third wood component and forming a second continuous phase extending throughout the outer structural member. The method comprises the step of mixing together a first quantity of a first wood component of wood chips having long axes and a first size range, a second quantity of a second wood component of wood particles having a second size range distinct from the first size range, and a third quantity of a first thermoplastic component of molten thermoplastic, until substantially all of the wood chips and the wood particles are encapsulated by the thermoplastic. It further includes the step of orienting the long axes of the wood chips of the first wood component such that they are substantially parallel to a predetermined plane. It further includes the step of depositing a loose material constituting a mixture of the wood chips encapsulated in the thermoplastic and the wood particles encapsulated in the thermoplastic onto a press inlet feed unit while maintaining the orientation of the long axes of the wood chips. It further includes the step of pressing the loose material in a direction substantially parallel to the predetermined plane such that it is compacted and such that the long axes of the wood chips are aligned substantially parallel to one another, thereby forming an inner structural member. It further includes the step of mixing together a fourth quantity of a third wood component of wood particles having a third size range and a fifth quantity of a second thermoplastic component of molten thermoplastic until substantially all of the wood particles are encapsulated by the thermoplastic. It further includes the step of joining the material formed by mixing the third wood component and the second thermoplastic to the inner structural member.

In still another aspect, the invention comprises a compounder unit for mixing and orienting shaped pieces within a viscous material. The compounder unit comprises an outer casing having exterior walls defining a longitudinal cavity therein, the cavity being subdivided into a material inlet section, a mixing section, an orientation section, and an outlet passage and having a long axis passing therethrough. At least one compounding shaft is positioned within the longitudinal cavity parallel to the long axis, the compounding shaft having a plurality of blades formed thereon. The blades on a portion of compounding shaft within the orientation section include screw blades having a pitch which progressively decreases as the distance from the blade position to the outlet passage decreases.

In still another aspect, the invention comprises a coating die apparatus for extruding a viscous materials. The apparatus comprises an exterior casing that defines a longitudinal cavity and a shaft rotatably mounted in the cavity. The shaft has a plurality of mixing elements mounted thereon defining a feed section and a dispensing section. The mixing elements in the feed section have a positive pitch for urging molten material received into the feed section of the cavity into the dispensing section of the cavity and the mixing elements in the dispensing section urge molten material received in the dispensing section tangentially against the interior of the exterior casing. The exterior casing further defines a dispensing slot formed tangentially through the exterior casing and extending longitudinally across the dispensing section. Molten material received into the dispensing section is sliced off by the exposed inner edge of the casing to form a raw sheet of molten material which exits the dispensing slot.

BRIEF DESCRIPTION OF THE DRAWINGS

For a more complete understanding of the present invention and the advantages thereof, reference is now made to the following description taken in conjunction with the accompanying drawings in which:

FIG. 9 is a simplified block diagram of a method for manufacturing a thermoplastic composite wood material in accordance with another embodiment;

FIGS. 10a and 10b illustrate the orientation of the wood chips at the exit of the inner compounder, FIG. 10a being a side view and FIG. 10b being an end view;

FIG. 15 illustrates diagrammatically the continuous press unit;

FIGS. 16a and 16b illustrate the compression rollers of the continuous press unit, FIG. 16a being an end view (in the direction of material flow) and FIG. 16b being a side view;

FIGS. 20a and 20b illustrate cross sectional views of the coating die in FIGS. 19a and 19b, FIG. 20a being an enlarged section taken along line 20a—20a of FIG. 20b and FIG. 20b being a section taken along line 20b—20b of a FIG. 20a.

DETAILED DESCRIPTION OF THE INVENTION

Figure 1:
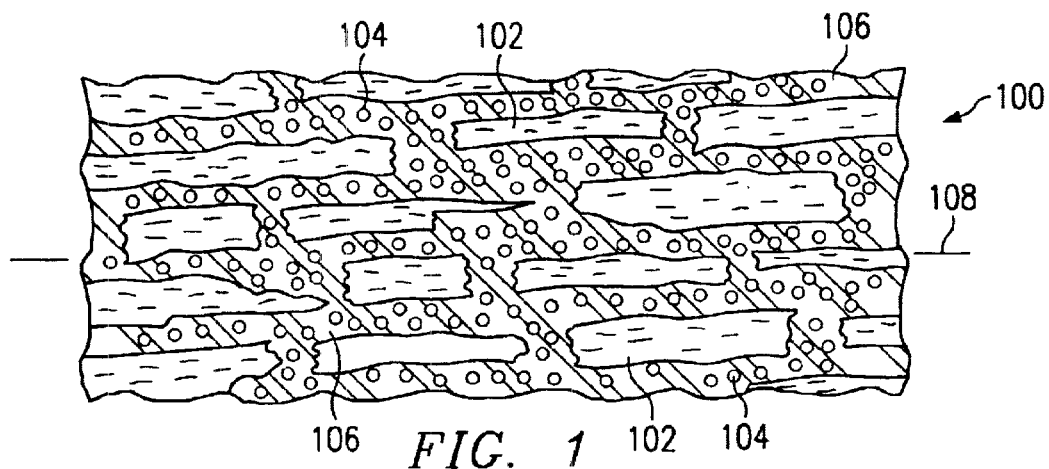
FIG. 1 illustrates an enlarged sectional view of a portion of composite wood material in accordance with one embodiment of the current invention, comprising two distinct discontinuous phases of wood pieces dispersed in a continuous thermoplastic matrix, it being understood that the distance shown between the wood pieces is exaggerated for purposes of illustration.

Referring now to FIG. 1, there is illustrated a thermoplastic composite wood material 100 in accordance with a first embodiment of the current invention. The composite wood material 100 comprises a first wood component of substantially axially aligned wood chips 102 having a first size range and being distributed throughout the composite material in the first discontinuous phase. A second wood component of wood particles 104 having a second size range is distributed between the wood chips 102 and throughout the composite wood material 100 in a second discontinuous phase. As is further described below, the second size range of the wood particles 104 is distinct from the first size range of the wood chips 102, and has substantially smaller values than the first size range. A thermoplastic polymer component encapsulates (i.e., fully coats) the wood chips 102 and the wood particles 104, forming a continuous phase or matrix 106 extending throughout the composite wood material 100. An axis 108 may be defined passing through the material 100 as shown. It will be appreciated in FIG. 1, that the distance between the wood chips 102 and the wood particles 104 is exaggerated for purposes of illustration. The actual thickness of the thermoplastic component 106 between the wood components must only be sufficient to encapsulate the individual wood chips 102 and wood particles 104. Thus, in the finished composite wood material the wood chips 102 and wood particles 104 will be very tightly packed together.

Figure 2A:
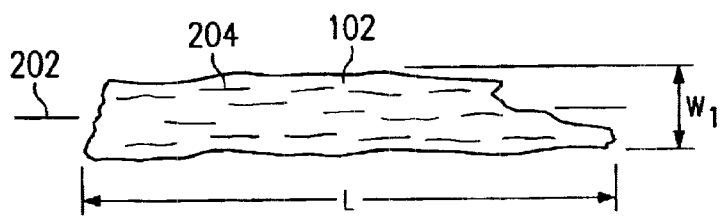
FIGS. 2a and 2b illustrate enlarged views of a representative wood chip from the first discontinuous phase, FIG. 2a being a side view and FIG. 2b being an end view.
Figure 2B:
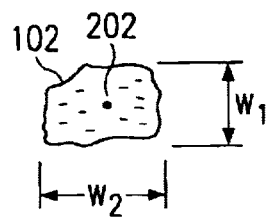

Referring now to FIGS. 2a and 2b, there is illustrated an enlarged view of a wood chip 102 of the type in the first wood component. As best seen in FIG. 2a, the wood chip 102 is characterized by a length L defined by the largest dimension of the wood chip, and by a dimension W, which is the larger of the two widths $W_1$ and $W_2$ measured perpendicular to each other and to the length L. A long axis 202 passes through the wood chip 102 in a direction parallel to the length L. Typically, although not exclusively, the long axis 202 is substantially parallel to the grain 204 of the wood. The wood chips 102 of the first wood component are substantially axially aligned when their long axes 202 are substantially parallel to one another and to the material axis 108.

Figure 3:
FIG. 3 illustrates an enlarged view of a representative wood particle from the second discontinuous phase.

Referring now to FIG. 3, there is illustrated an enlarged view of a wood particle 104 of the type in the second wood component. The wood particle 104 is characterized by a single dimension D, which is the particle's largest dimension.

Figure 4:
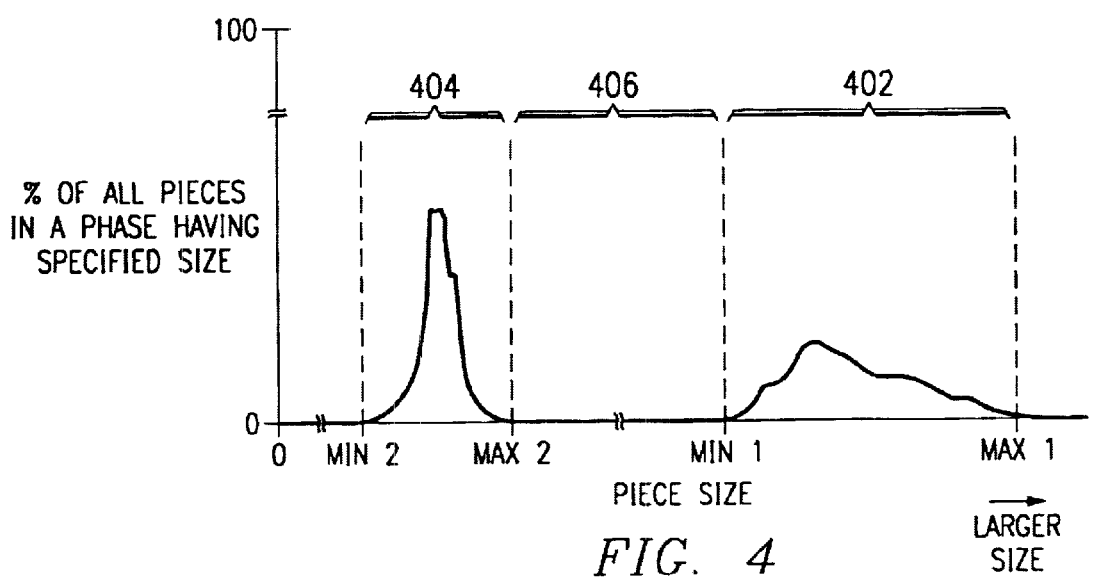
FIG. 4 is a graph showing piece size versus the percentage of all pieces in a phase having the specified size for the wood pieces in the material.

Referring now to FIG. 4, it is illustrated that the wood chips 102 in the first wood component have a range of dimensions (e.g., L and W) within a first size range 402 between $Min_1$ and $Max_1$, and the wood particles 104 in the second wood component have a range of dimensions (e.g., D) within a second size range 404 between $Min_2$ and $Max_2$. In other words, substantially all of the wood chips 102 have dimensions ranging between $Min_1$ and $Max_1$, and substantially all of the wood particles 104 have a dimension ranging between $Min_2$ and $Max_2$. The size range of the wood particles 104 is considered "distinct" from the size range of wood chips 102 because the largest wood particles, having a size $Max_2$, are substantially smaller than the smallest wood chips, having a size $Min_1$. Put another way, this distinction is represented by the gap 406 between the first size range 402 and the second size range 404, indicating that the thermoplastic composite wood material 100 comprises substantially no wood pieces having a size between $Max_2$ and $Min_1$.

The range sizes for the wood pieces in the first and second wood components can vary from one embodiment to another. For example, in one embodiment, the wood chips 102 have a first size range with length dimension L from about ¼ inch to about 2 inches and width dimension W from about 1/16 inch to about 3/4 inch, and the wood particles 104 have a second size range with diameter D from about 0.010 inch to about 0.076 inch (i.e., from about 60 mesh to about 9 mesh). In a more preferred embodiment, the wood chips 102 have a first size range with the length dimension L from about 1/4 inch to about 1-1/2 inches and a width dimension W from about 1/16 inch to about 1/4 inch, and the wood particles 104 have a second size range with a diameter D from about 0.016 inch to about 0.046 inch (i.e., from about 40 mesh to about 16 mesh). In a still more preferred embodiment, the wood chips 102 have a first size range with the length dimension L from about 3/4 inch to about 1-1/4 inch and a width dimension W from about 1/8 inch to about 1/4 inch, and the wood particles 104 have a second size range with a diameter D from about 0.023 inch to about 0.033 inch (i.e., from about 30 mesh to about 20 mesh).

Figure 5:
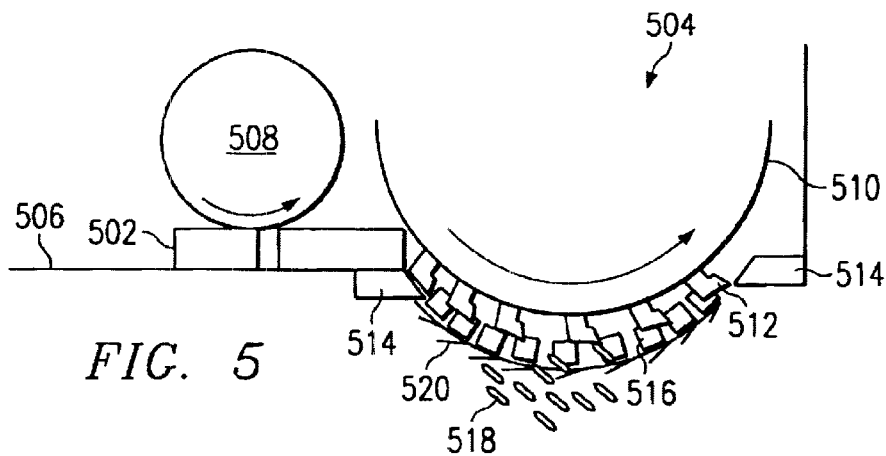
FIG. 5 illustrates a baffled grinding apparatus for producing wood chips suitable for the first wood component.

Referring now to FIG. 5, there is illustrated a baffled screen grinding apparatus for producing wood chips 102 which are suitable for the first wood component of the thermoplastic composite wood material. While it will be appreciated that wood chips 102 having the necessary dimensions may be produced by a variety of methods and apparatus, a baffled screen grinding unit as illustrated in FIG. 5 has been determined to be particularly effective in producing suitable chips. Scrap wood or other wood raw material 502 is fed into a cutting chamber 504 of the grinding apparatus by a conveyor 506. A hold-down roller 508 may be used to ensure positive feeding of the raw material. A grinding rotor 510 having a plurality of cutting teeth 512 positioned around its periphery is located in the cutting chamber 504 and rotated at high speed. As the wood material 502 enters the cutting chamber 504, the cutting teeth 512 initially cut the wood against an anvil 514, thus reducing the wood to the size of the opening between the anvil and the cutting teeth. This opening is typically about 1/4 the width of the cutting teeth 512 (which in this case is about 1 inch). The cutting teeth 512 are staggered on the grinding rotor 510 to allow larger pieces to pass the anvil 514 onto a screen 516. The screen 516 is set approximately 1/4 inch away from the grinding rotor 510 so that the cutting teeth 512 grind the wood as it moves across the surface of the screen at 516. Centrifugal force and the force of the cutting teeth 512 push a plurality of precursor wood pieces 518 through the openings in the screen 516 as they are ground. A plurality of baffles 520 are set around the periphery of the screen 516 so that the precursor wood pieces 518 passing through the screen are chopped off at a length of about 1 inch long or less. The precursor wood pieces 518 are thus reduced in size by the grinding operation until they will pass through the 1 mesh (i.e., 1 inch square) openings in the screen 516. In practice, it may take three separate grinding steps to produce wood chips 102 suitable for the first wood component: one grind through a 2 inch square baffled screen and two grinds through a 1 mesh (i.e., 1 inch square) baffled screen. Each successive grind reduces the size of the wood chips 518 to a more uniform size distribution.

It will be appreciated that during the grinding operation just described, wood pieces smaller than those desired for the first wood component will also pass through the baffled screen along with the precursor wood pieces 518. Accordingly, following the initial grinding to produce the precursor wood pieces 518, the resulting material is then screened to remove the undersized particles (also known as "fines"). It has been determined that a 1/4 inch or 3/16 inch horizontal shaker screen can be used to efficiently remove the fines from the precursor wood pieces. The exact size of shaker screen to be used depends upon the moisture level of the wood pieces in the amount of fines present. The shaker screen uses the force of gravity to move the smaller particles through the layers of larger wood chip and ultimately through the screen as the materials are shaken and/or vibrated. It has been determined that as a general rule, only wood pieces with both a length dimension L and a width dimension W (i.e., both width $W_1$ and thickness $W_2$) which are less than the shaker screen opening dimension will pass through the screen. Wood pieces having a width dimension W which is less than a screen opening size, but a length dimension L which is greater than the screen opening size a will typically not pass through the screen using this technique. Using this method, virtually all of the dust and fines that are less than 1/4 inch in length, width and thickness are removed from the precursor wood pieces 518, leaving only the wood chips 102, which are then used for the first wood component of the composite material.

After grinding and screening, the wood chips will typically have a moisture content in excess of about 12% by weight. It is preferred that the wood chips 102 of the first wood component have a surface moisture content of about 1% by weight or less. The desired moisture level is typically achieved by heating the wood chips 102 in a dryer at a temperature above 212° F. Preferably the wood pieces are heated to a temperature from about 220° F. to about 240° F. It is preferable that the smaller wood fines and wood particles be removed from the wood chips 102 prior to drying in order to control the flammability and/or autoignition characteristics of the material being dried.

In the thermoplastic composite wood material 100, the wood chips 102 of the first wood component and the wood particles 104 of the second wood component constitute, respectively, the first and second discontinuous phases that are distributed throughout a continuous phase, or matrix, of a thermoplastic polymer material 106. Various types of thermoplastic polymers may be used for the continuous thermoplastic component, including polypropylene, polyethylene, polyvinyl chloride (PVC), styrene and ABS, however, it has been determined that polypropylene is especially suitable for use in this invention. It is preferred that a polypropylene homopolymer be used for the continuous polymer phase 106 because such materials exhibit good melt and flow properties. It is more preferred to use a polypropylene homopolymer having a melt index in the range from about 0.5 to about 12. A polypropylene having a melt index from about 0.5 to about 2 is especially preferred in embodiments where only relatively sturdy components such as wood chips 102 and wood particles 104 are used. A polypropylene having a melt index from about 4 to about 12 is especially preferred in alternative embodiments where relatively fragile structural components such as fiberglass are included along with the wood chips and the wood particles.

In one embodiment of a thermoplastic composite wood material, the wood chips 102 constitute from about 100 to about 0 weight percent of the total weight of the first and second wood components, and the wood particles 104 constitute from about 0 to about 100 weight percent of the total weight of the first and second wood components. In this embodiment, the first and second wood components together constitute from about 90 to about 50 weight percent of the composite wood material, and the thermoplastic polymer component 106 constitutes from about 10 to about 50 weight percent of the composite wood material. It will be appreciated that the total weight percent of the first and second wood components and the thermoplastic polymer component maybe less than 100% of the total weight of the composite wood material to allow for the addition of small amounts (i.e., typically less than about 5% by weight of the total) of non-structural additive materials such as paraffins, colorants, UV stabilizers, fire-retardants, impact modifiers, and the like. In some alternative embodiments, however, a structural additive, e.g., fiberglass, may be added in considerable quantity such that the total weight of non-wood and non-thermoplastic components may be greater than about 5% by weight.

In another embodiment, the wood chips 102 constitute from about 90 to about 65 weight percent of the total weight of the first and second wood components and the wood particles 104 constitute from about 10 to about 35 weight percent of the total weight of the first and second wood components. In a more preferred embodiment, the wood chips constitute from about 85 to about 75 weight percent of the total weight of the first and second wood components, and the wood particles 104 constitute from about 15 to about 25 weight percent of the total weight of the first and second wood components. In yet another embodiment, the first and second wood components together constitute from about 80 to about 65 weight percent of the composite wood material and the thermoplastic polymer component 106 constitutes from about 20 to about 35 weight percent of the composite wood material. In a more preferred embodiment, the first and second wood components together constitute from about 77 to about 70 weight percent of the composite wood material, and the thermoplastic polymer component 106 constitutes from about 23 to about 30 weight percent of the composite wood material. A thermoplastic composite wood material in accordance with these embodiments will have a final compressed density from about 30 to about 50 pounds per cubic foot after pressing.

Figure 6:
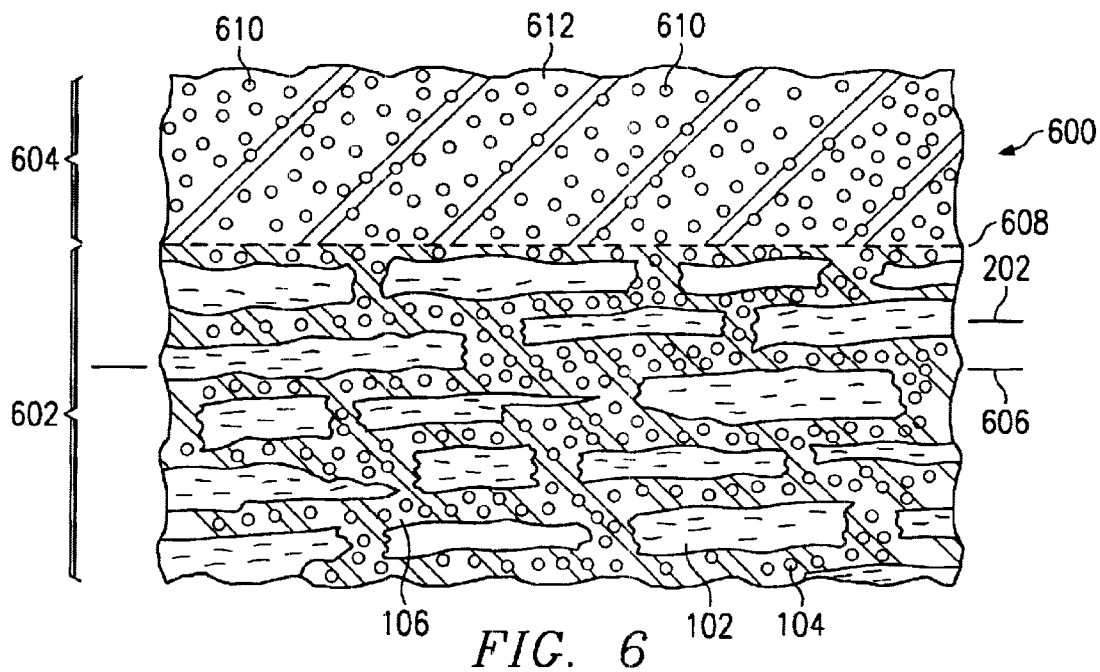
FIG. 6 illustrates an enlarged sectional view of a portion of a composite wood material in accordance with another embodiment of the current invention, comprising an inner structural member continuously joined to an outer structural member, it being understood that the distance shown between the wood pieces is exaggerated for purposes of illustration.

Referring now to FIG. 6, there is illustrated a two-part thermoplastic composite wood material 600 in accordance with another embodiment. The composite wood material 600 comprises an inner structural member 602 which is continuously joined to an outer structural member 604. The inner structural member 602 is made from a thermoplastic composite wood material substantially identical to the material 100 previously described, i.e., it includes a first wood component of substantially axially aligned wood chips 102 having a first size range and being distributed through the inner structural member in a first continuous phase, a second wood component of wood particles 104 having a second size range and being distributed between the wood chips 102 in a second discontinuous phase, and a first thermoplastic polymer component which encapsulates the wood chips 102 of the first wood component and the wood particles 104 of the second wood component, forming a first continuous phase extending throughout the first structural member. As previously described, the second size range of the wood particles 104 is distinct from the first size range of the wood chips 102 and has substantially smaller values than the first size range. In the inner structural member, the first and second wood components together constitute from about 90 to about 50 weight percent of the inner structural member and the first thermoplastic polymer component 106 constitutes from about 10 to about 50 weight percent of the inner structural member. As previously described for the composite wood material 100, the first structural member 602 has an axis 606 running therethrough and the wood chips 102 of the first wood component are substantially aligned therewith. Put another way, the long axes 202 of the individual wood chips 102 are substantially parallel to one another and to the axis 606 of the inner structural member.

The outer structural member 604 is continuously joined to the inner structural member 602 along a boundary 608. The outer structural member 604 comprises a third wood component of wood particles 610 having a third size range distributed throughout the outer structural member in a third discontinuous phase and a second thermoplastic polymer component which encapsulates the wood particles and forms a second continuous phase 612 extending throughout the outer structural number. In the two-part thermoplastic composite wood material 600, the third wood component constitutes from about 10 to about 50 weight percent of the outer structural member and the second thermoplastic polymer component constitutes from about 90 to about 50 weight percent of the outer structural member. Wood particles 610 of the third wood component may be of various sizes, however typically they will have a size range similar to the size range of the wood particles 104 in the inner structural member. In some embodiments, the wood particles 610 of the third wood component can be taken from the same source of supply as the wood particles 104 of the second wood component. Accordingly, in one embodiment of the composite wood material 600, the first size range includes wood chips 102 having an axial length from about ¼" to about 2" and a width from about ⅟16" to about ¾", the second size range includes wood particles 104 having a diameter from about 0.010" to about 0.076" (i.e., from about 60 mesh to about 9 mesh), and the third size range includes wood particles 610 having a diameter from about 0.010" to about 0.076" (i.e., from about 60 mesh to about 9 mesh). In another embodiment, the composite wood material 600 includes an inner structural member having a density from about 30 to about 50 lbs. per cubic foot and the outer structural member has a density from about 50 to about 80 lbs. per cubic foot.

The first polymer component 106 of the thermoplastic composite wood material 600 maybe any thermoplastic material as discussed for the composite wood material 100. The second polymer component of the outer structural member may be the same thermoplastic material which is used in the inner structural member. In many cases, however, the polymer material for the second polymer component will be selected to provide the outer structural member with different properties than the inner structural member. For example, in one embodiment of the composite wood material 600, a polypropylene homopolymer is utilized for the first polymer component 106 and a polypropylene copolymer is utilized for the second polymer component 612. It has been found that the use of the polypropylene copolymer results in an outer structural member having greater impact resistance than the inner structural member.

Figure 7:
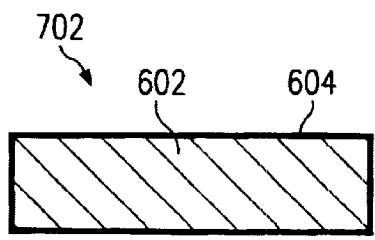
FIG. 7 illustrates a cross-sectional view of an extrudate formed from the composite wood material in accordance with another embodiment in which the outer structural member completely surrounds the inner structural member.

The two part thermoplastic composite wood material 600 may be used to produce a variety of useful building materials and other products. For example, referring to FIG. 7, the two part thermoplastic composite wood material 600 may be formed into a structural product 702 which, when viewed in axial cross-section, has the outer structural member 604 which completely encloses the inner structural member 602. Such materials are especially well suited for exterior building applications, e.g., fencing or decking, where the outer structural member 604 may be formulated to provide good weather and impact resistance while the inner structural member 602 is formulated to provide maximum strength and low weight or density.

Figure 8:
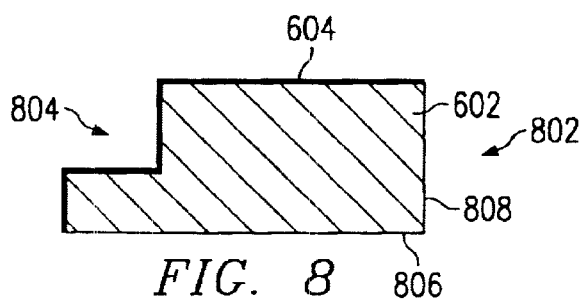
FIG. 8 illustrates a sectional view of another extruded member in accordance with another embodiment in which the outer structural member does not completely surround the inner structural member.

Referring now to FIG. 8, there is illustrated another product formed using the two-part thermoplastic composite wood material 600, wherein the outer structural member 604 is contiguous with one or more edges of the inner structural member 602, but does not completely surround the inner structural member. Further, it is illustrated that both the inner structural member 602 and outer structural member 604 may be formed with various contours 804 as necessary for a particular application. The building product 802 and similar articles may be particularly useful in applications such as window casings or decorative molding, where only a portion of the material is exposed to the elements. In such cases, the weather exposed portions are covered by the outer structural member 604 to provide good weather resistance, and/or impact resistance while the non-exposed areas 806, 808 may comprise only the inner structural member 602.

Referring now to FIG. 9, there is illustrated a process for manufacturing the thermoplastic composite wood materials previously described. Block 902 represents the wood raw material which will be used to form the first, second and third (i.e., if applicable) wood components. The wood material may be virgin wood or, preferably, industrial manufacturing waste wood (e.g., lumber cutoffs) or scrap wood (e.g., old wooden pallets). The raw wood material proceeds to block 904 where it is first ground and screened to form properly sized wood chips. Suitable grinding and screening operations were described in detail previously. The resulting wood chips within the first size range proceed via path 906 to block 908, where they are dried by heating in order to reduce the surface water content to about 1% by weight or less. Preferably, the wood chips are dried in a natural gas-fired dryer using combustion gases which are oxygen depleted to prevent burning of the chips. After drying, a portion of the wood chips are taken from block 908 via path 914 to grinding block 912. Preferably, the wood chips are transported from the dryer to the grinder using a side stream of combustion gas to further dry the chips. In block 912, the wood chips are further ground and then screened to form particles within the size range for the second wood component and, if applicable, the third wood component. In addition, it is preferred that the particles are further dried to reduce their surface moisture content to about 0.5% by weight or less.

Dried wood chips constituting the first wood component (wood Phase 1) proceed from the drying block 908 to the block 916 for compounding. Similarly, wood particles constituting the second wood component (wood Phase 2) proceed from the second grinding block 912 to the compounding block 916. The block 918 represents the thermoplastic raw material which will be used for the first polymer component. The first thermoplastic raw material maybe virgin thermoplastic pellets or beads, recycled thermoplastics, or a combination of both. In addition, plastic additives (e.g., impact modifiers, antioxidants, UV stabilizers, colorants, fire-retardants, etc.) may be added to the unmelted plastic feedstock if it is desired to modify the properties of the first thermoplastic component. The first thermoplastic raw material and any plastic additives proceed to block 920 where they are mixed, heated until molten and then extruded in a molten state into the compounding operation represented by block 916. In the compounding operation 916, the first and second wood components are thoroughly mixed together with the molten first thermoplastic component until the wood chips and wood particles are encapsulated or thoroughly coated by the thermoplastic material. In addition, structural additives such as glass fibers maybe added during the mixing/compounding operation 916. A small amount of paraffin wax additive (typically about 0.5 to 1.0% by weight) maybe added into the compounder to improve processing of the wood chips. It is believed that the paraffin acts in several ways: first, as a lubricant allowing the wood chips and particles to move more easily relative to one another for orientation and alignment; second, as a heat transfer medium; and third, as an agent to enhance the flow of the polymer around the wood pieces. The paraffin wax may be added in a molten state by spraying it into the compounder using spray nozzles.

After the wood chips 102 and wood particles 104 have been encapsulated with the thermoplastic material, in the mixing step 916, the wood chips are then oriented such that their long axes 202 are parallel to a predetermined plane. This step of the process is represented by block 922. The orientation step 922 does not necessarily result in the wood chips 102 being axially aligned at this point, for the long axes 202 in the various chips may be directed at various angles to one another as long as they are parallel to the predetermined plane.

Referring now to FIGS. 10*a* and 10*b*, two chips (denoted 102' and 102") of the first wood component are shown in relation to a plane 1002. As best seen in FIG. 10*a*, the axes 202 of the chips are not parallel to one another, however, as best seen in FIG. 10*b*, the axes are both parallel to the predetermined plane 1002. This is an example of the wood chip orientation performed in step 922 of the process of FIG. 9.

While the mixing step 916 and the chip orientation step 922 may be carried out in separate operations, in a preferred embodiment of the process these steps are performed in a single continuous operation. In a more preferred embodiment, the mixing step 916 and the chip orientation step 922 are performed in a single compounder unit. It will be appreciated that the orientation of the wood particles 104 constituting the second wood component may or may not be affected by the orientation process 922, however this is not an issue since no particular orientation of the wood particles is required in the thermoplastic composite wood material.

The mixture of oriented wood chips 102, wood particles 104, and encapsulating molten thermoplastic next passes out of the mixing and/or orienting unit and is deposited onto the inlet feed of a directional press unit. This step is represented by block 924. It is significant that the orientation of the wood chips 102 achieved in step 922 is maintained as the mixture is deposited. In a preferred embodiment, the temperature and composition parameters of the thermoplastic-wood mixture are controlled to produce a loose material, i.e., a material having discreet nodules or "clumps" of material rather than a continuous strand.

Figure 11A:
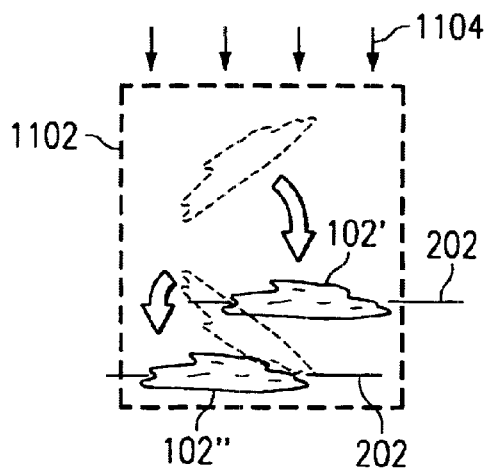
FIGS. 11a and 11b illustrate the alignment of the wood chips at the exit of the continuous press, FIG. 11a being a side view and FIG. 11b being an end view.
Figure 11B:
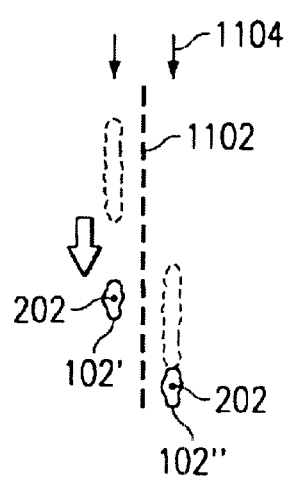

The loose material comprising oriented wood chips 102, wood particles 104 and still-molten thermoplastic next moves to a directional press unit, denoted by block 926. The directional press unit applies force to the loose material, simultaneously compressing it and causing the oriented wood chips 102 to become substantially axially aligned. In this case, substantially axially aligned means that the axes 202 of the individual wood chips are substantially parallel to one another. Referring now to FIGS. 11*a* and 11*b*, the two wood chips 102' and 102" are shown moving from their oriented configuration (shown in broken line) with axes 202 parallel to plane 1102, to an axially aligned configuration with axes 202 parallel to one another, under the influence of the directional forces 1104 applied by the directional press. It will of course be appreciated that the mixture must be constrained from moving laterally during the pressing operation to efficiently achieve the axially aligned condition for the first wood component. After the directional pressing operation 926, the basic thermoplastic composite wood material is essentially complete as indicated in block 928. If a single-part composite product is required, then the finished material from block 928 may then be cooled until the thermoplastic component hardens as indicated by block 930.

The finished material may also be subjected to various finishing operations, for example embossing the material surface with a decorative pattern, surface finishing, coding or marking.

Alternatively, if a two-part composite wood material is desired, i.e., one having an inner structural member and an outer structural member as previously described and illustrated in FIG. 6, then the basic process just described must be expanded. Referring still to FIG. 9, the thermoplastic raw material of the second polymer component is represented by block 932. Plastic additives (e.g., impact modifiers such as linear low-density polyethylene, anti-oxidants, UV stabilizers, colorants, fire-retardants, etc.) maybe added to the unmelted plastic feedstock if it is desired to modify the color and/or properties of the outer structural member. This material is passed to an extruder 934 where it is mixed, heated until molten, and then extruded into a mixing operation 936. Meanwhile, the wood particles 610 of the third wood component are prepared in the grinding and screening operation 912 and then moved to the mixing operation 936 via path 938. The mixing operation 936, which is preferably accomplished using a compounder unit, thoroughly mixes the wood particles 610 and the molten thermoplastic until the particles are encapsulated. As with the first compounder step 916, a small amount of paraffin wax additive (typically about 0.5% by weight) may be added into the second compounder step 936 to improve processing of the wood particles. The resulting mixture of thermoplastic and encapsulated wood particles 610 then proceeds to the application operation, represented by block 940. In the application operation 940, the molten mixture of the second thermoplastic component 612 and the third wood component 610 is continuously joined to the previously completed one-part composite wood material from block 928. The application of the outer structural member may completely enclose the inner structural member, or it may only partially enclose the inner structural member. The application process may be accomplished by conventional extrusion of the outer material around the inner material using a hot melt extruder and profile molder, by the use of calender forming rolls to form a sheet of outer material for application to the inner structural member or by the use of newly developed coating die equipment as further described herein.

Figure 12:
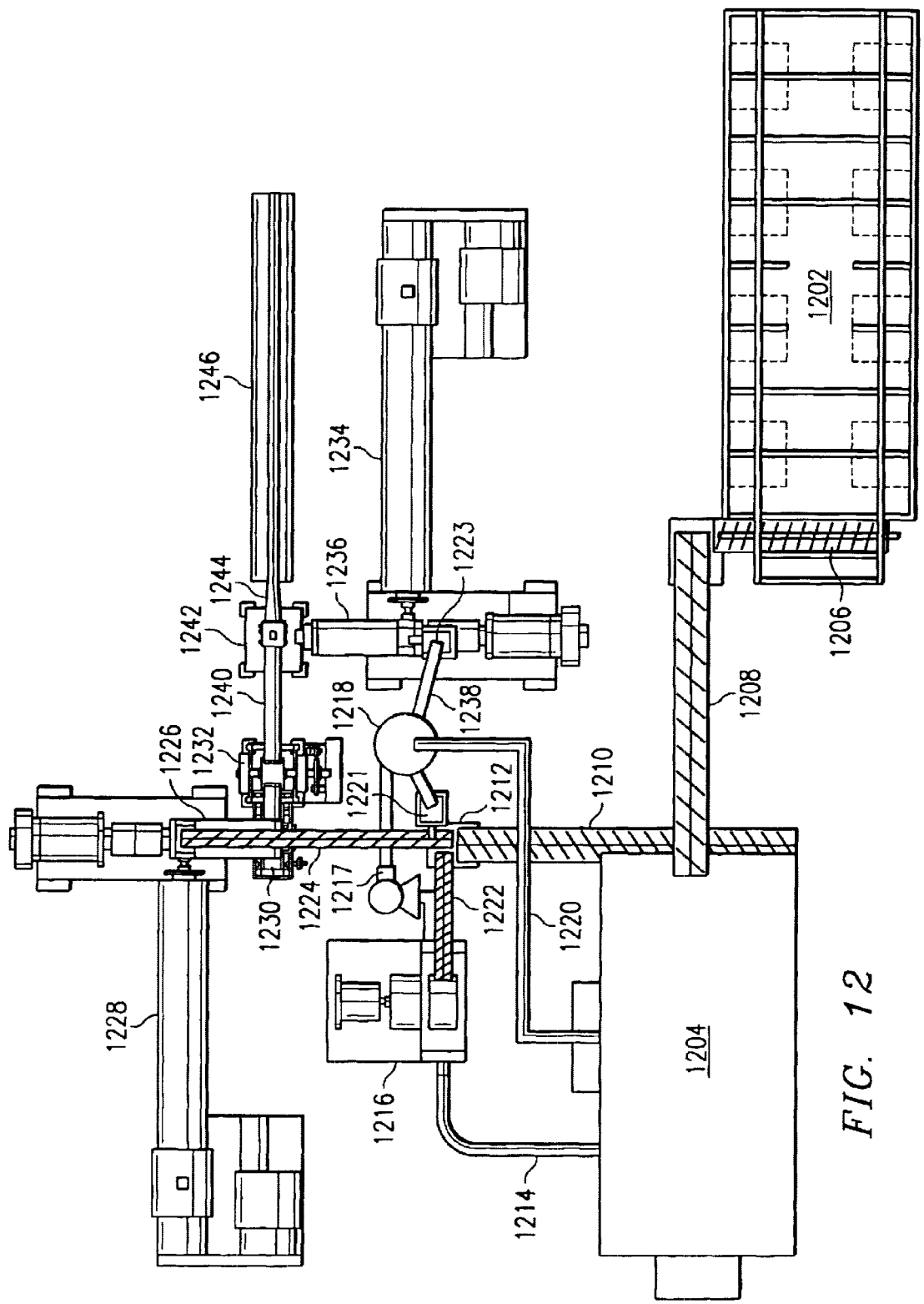
FIG. 12 illustrates a plan view of a plant for manufacturing the thermoplastic composite wood material.

Referring now to FIG. 12, there is illustrated the layout for a plant suitable for manufacturing a thermoplastic composite wood material in accordance with another embodiment of the current invention. Wood chips of suitable size for the first wood component are stockpiled in a wood bin 1202. The wood chips 102 are transferred as needed to a drier unit 1204 via transfer augers 1206 and 1208. The drier 1204 preferably uses combustion gases (i.e., gases resulting from combustion that have little or no remaining free oxygen) at an elevated temperature to dry the chips until they have a moisture content of about 1 weight percent or less. In a preferred embodiment the drier is fired with natural gas. The dried chips 102 are then transferred via auger 1210 to a bin 1212. Some of the wood chips are taken from the bin 1212 via auger 1222 to a grinding mill 1216 to produce the wood particles 104 for the second wood component. In this embodiment, the wood particles 610 for the third wood component have the same size range as the wood particles 104, and thus are produced in the same mill 1216. It will be appreciated that another grinding mill could be provided if the wood particles 610 had a different size range. Preferably, a side stream of hot (i.e., typically about 250° F.) combustion gases are taken from the dryer 1204 to the grinding mill 1216 via a duct 1214 to further dry the wood particles such that their moisture content is about 0.5 weight percent or less. These gases are further used to transport the dried wood particles from the grinding mill 1216 to a cyclone unit 1218 via a duct and blower 1217. The cyclone unit 1218 separates the wood particles from the combustion gases, routing the combustion gases back to the dryer 1204 via a duct 1220, and routing the dried wood particles to metering devices 1221 and 1223. The metering devices 1221 and 1223 control the flow of the wood particles from the cyclone unit 1218 to the respective compounders so as to maintain the proper proportion of components. The first and second wood components are then transferred, respectively, from the bin 1212 and the metering unit 1221 via auger 1224 to an inner compounder unit 1226. As previously described, a small amount of paraffin wax additive (typically about 0.5 to about 1% by weight) may be added directly into the inner compounder at this point to improve processing of the wood components and to act as a heat transfer medium in the compounder. It will be appreciated that the amount of wood particles 104 present in the wood components introduced into the inner compounder 1226 may be controlled by a metering device, e.g., metering device 1221, to determine the final compressed density of the inner structural member. Glass fibers or other structural additives may also be added into the compounder to achieve certain physical properties of the inner structural member.

The thermoplastic raw material for the first polymer component is introduced into an inner extruder 1228. In addition, plastic additives, for example, impact modifiers, anti-oxidants, UV stabilizers, colorants, and fire-retardants, may be added to the unmelted plastic feedstock in the extruder if desired. The inner extruder 1228 then mixes the feedstock (and additives, if present) and heats it above its melting point. The molten thermoplastic material is injected into the inner compounder 1226 where it is compounded with the wood chips 102 and wood particles 104 at a temperature less than the ignition temperature of the wood pieces (typically less than about 400° F.). While not used in this embodiment, in alternative embodiments glass fibers or other structural additives may also be added into the compounder for mixing with the thermoplastic and wood particles. The wood chips 102, wood particles 104 and thermoplastic materials are compounded, or mixed, together in the compounder 1226 with a minimal size reduction of the wood pieces. In other words, the compounder 1226 is designed to minimize any grinding, breaking or shredding of the wood chips 102 such that the original desired dimensions are maintained. The compounder 1226 performs two essential functions in the process. First, it thoroughly mixes the wood chips 102, wood particles 104 and melted thermoplastic material so as to thoroughly encapsulate the wood pieces with thermoplastic. Secondly, the inner compounder 1226 serves to orient the random alignment of the wood chips 102 such that their long axes are perpendicular to the direction of material flow.

Figure 13:
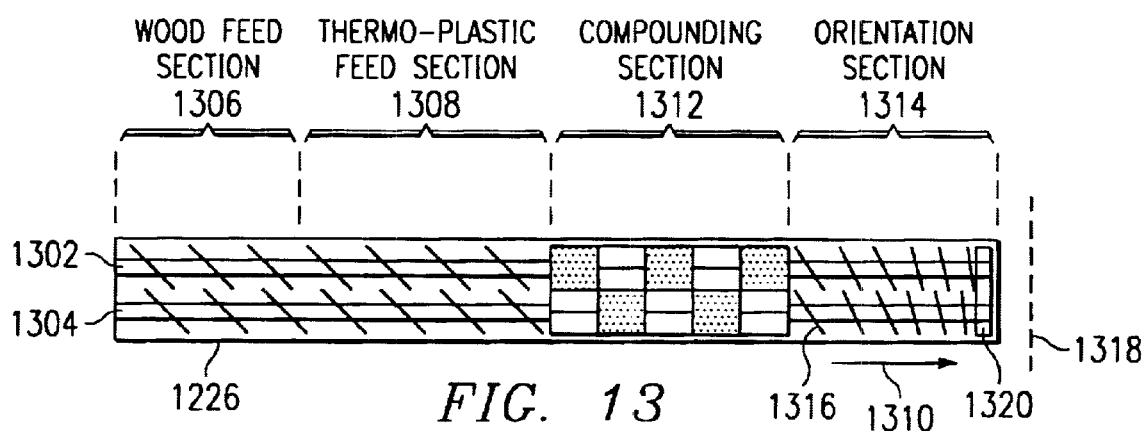
FIGS. 13 and 14 illustrate diagrammatically the inner compounder unit, FIG. 13 being a plan view and FIG. 14 being a side view.
Figure 14:
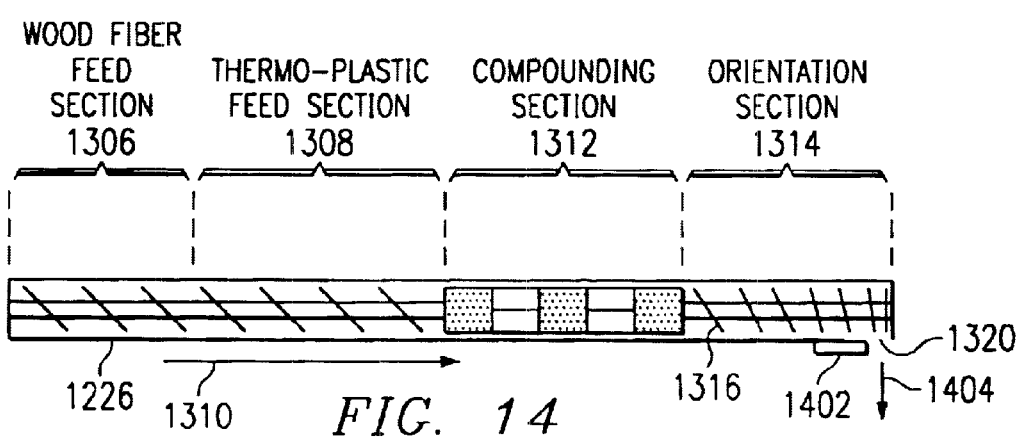

Referring now to FIGS. 13 and 14, there is illustrated a diagrammatic view of a compounder unit suitable for performing the compounding and orienting operations previously described. FIG. 13 shows a top view of the inner compounder 1226 having two feed screws 1302 and 1304 positioned in a parallel configuration. The compounder 1226 has a wood feed section 1306 and a thermoplastic feed section 1308 for accepting their respective components and moving them through the compounder in a flow direction denoted by arrow 1310. It will be appreciated that the relative positions of the wood feed section 1306 and the thermoplastic feed section 1308 maybe reversed if desired, i.e., the relative order of introduction of the wood components and the thermoplastic components into the compounder is typically not a critical factor provided the components are thoroughly mixed. The component materials are transported by the feed sections 1306, 1308 into a compounding section 1312 having mixing elements for the compounding of the components until the wood chips and wood particles are thoroughly encapsulated by the molten thermoplastic. The various compounder components are generally selected to minimize, and preferably eliminate, any crushing, grinding or other size reduction of the wood components being compounded.

It will be understood that the wood feed section 1306, thermoplastic feed section 1308 and compounding section 1312 of the compounder unit 1226 are generally conventional in nature. The compounder unit 1226 of the current embodiment, however, further includes an orientation section 1314 for orienting the previously random alignment of the wood chips 102 in a direction perpendicular to the material flow 1310. This orientation is accomplished by equipping the compounder shafts 1302 and 1304 with screw elements 1316 having a screw pitch which becomes progressively smaller as the distance to the compounder outlet is reduced. In other words, as the wood pieces 102 move through the orientation section 1314 in the direction of material flow 1310, the screw elements 1316 will become closer together while simultaneously assuming an orientation which is closer to perpendicular with respect to the material flow. This will cause the wood chips 102 of the first wood component to become oriented with their long axes 202 substantially parallel to a predetermined plane, e.g., the plane 1318 which is perpendicular to the material flow direction 1310. An outlet opening 1320 is provided on the lower end of the compounder unit 1226, allowing the mixed and oriented components to exit the compounder while maintaining the orientation of the wood chips 102.

Referring now to FIG. 14, there is illustrated a side view of the inner compounder 1226. The compounder exit opening 1320 is equipped with an adjustable slide gate 1402 which serves to control the flow rate of mixture leaving the compounder 1226 and also further orients the wood chips 102 so that their axes 202 are generally parallel to a predetermined plane, or put another way such that the axes 202 are generally perpendicular to the direction of material flow 1310.

At a given feed rate of materials into the inner compounder 1226, and at a given RPM of the feed screws 1302 and 1304, the adjustable slide gate 1402 is set to control the compression and compounding/mixing intensity that occurs within the inner compounder. The inner compounder may have either heating or cooling jackets in order to maintain the desired conditions within the compounding section 1312. The compressed and compounded materials are discharged from the inner compounder through the exit opening 1320 as indicated by arrow 1404 and deposited on an inlet conveyor 1230 (FIG. 12) where they are allowed to expand to an uncompressed state.

While the compounded and oriented mixture produced by the inner compounder 1226 may exit as a continuous flow or strand of material, it preferably has a discontinuous consistency similar to that of loose fiberglass insulation. This material is transported by the press inlet conveyor 1230 to a continuous press 1232 where the material will be compressed to its final density and the wood chips 102 aligned to give the resulting composite wood material its favorable strength and bending characteristics.

Referring now to FIG. 15, there is illustrated a diagrammatic side view of a continuous press 1232 suitable for use in this process. In the particular embodiment illustrated in FIG. 12, the continuous press 1232 operates at a 90° angle from the direction of material flow through the inner compounder 1226. The compounded material exiting the inner compounder 1226 falls vertically downward from the exit opening 1320 across a distributor plate 1502, which moves back and forth laterally to distribute the falling material (denoted 1504) across the width of the conveyor inlet section 1506. It will be appreciated that the orientation of the wood chips 102 in the falling mixture 1504 is generally maintained as they are distributed on the conveyor to form an uncompressed mass (denoted 1508). The feed conveyor 1230 moves the uncompressed mass 1508 across a horizontal transfer plate 1510 and into the space between upper and lower compression rollers 1512 and 1514. The upper and lower rollers 1512 and 1514 turn in opposite directions (as denoted by arrows 1516 and 1518) and are synchronized to rotate at the same speed as the travel of the compounded material 1508 on the conveyor. As the material passes between the rollers 1512 and 1514, it is compressed and the oriented wood chips 102 become aligned in the horizontal plane, i.e., parallel to the direction of travel (denoted by arrow 1520) of the compounded material. After exiting the continuous press, the compressed aligned material (denoted 1522) may enter a retainer tube 1524 which maintains the profile of the material until the thermoplastic component cools and hardens (if a one-part composite material is being produced), or until the outer structural member is applied (if a two-part composite material is being produced). In other words, the compressed aligned material 1522 is nearly finished thermoplastic composite wood material of the single part form, requiring only cooling, cut off, and surface finishing (if desired) to be complete.

Referring now to FIGS. 16a and 16b there is illustrated further details of a continuous press 1232. As best seen in FIG. 16a, the space 1602 between the opposing faces of the rollers 1512 and 1514 is termed the inner profile, as it controls the profile of the resulting inner structural member. The continuous press has side members 1604, 1606, 1608 and 1610 that define the width of the inner profile 1602. In addition, side plates (not shown) are provided on each side of the material flow path to confine and guide the loose material as it travels on the conveyor 1230, passes through the continuous press 1232, and goes into the retainer tube 1522. The rollers 1512 and 1514 have slots 1611 on each side of the roller, i.e., between the roller and the side members 1604,1606,1608 and 1610, to accommodate the side plates as they pass through the continuous press. In a preferred embodiment, the side members 1604, 1606, 1608 and 1610 are adjustable to allow the width of the inner profile 1602 to be changed. Preferably, the vertical spacing between the rollers 1512 and 1514 can be adjusted to change the height of the profile and/or to change the amount of compression exerted on the uncompressed material 1508. As best seen in FIG. 16b, a pair of intermeshing gears 1612 and 1614 maybe provided on the roller shafts 1616 and 1618 in order to synchronize movement of the rollers 1512 and 1514 with one another and with the motion of the composite wood mixture as it passes through the inner profile 1602. In other embodiments, sprockets connected with a chain or toothed belt may be used to synchronize the rollers of the continuous press.

As previously described, the thermoplastic composite wood material 1522 which leaves the continuous press 1232 may represent the desired final product, e.g., a building material for fencing or decking. If plastic additives such as colorants, anti-oxidants, UV stabilizers, etc. were added to the plastic feedstock in the inner extruder, then the composite wood material may need little finishing other than being cooled, having a surface decoration added (if desired) and being cut to length. However, since the wood chips 102 may be exposed or very near the surface of the material, the surface finish of such a product may be rough or unsuitable for exterior usage. For similar reasons, the single-part composite wood material may not have the desired impact or weather resistance for certain applications. When it is desired to produce a two-part thermoplastic composite wood material, i.e., having an outer structural member joined to the inner structural member which exits the continuous press 1232, then additional plant equipment is required as described below.

Referring again to FIG. 12, the thermoplastic raw material for the second polymer component is introduced into an outer extruder 1234. As previously described, this second polymer component may be the same type of thermoplastic used for the first polymer component, or it can be a different type of thermoplastic. Further, as previously described for the inner extruder, plastic additives such as colorants, impact modifiers (e.g., linear low-density polyethylene), antioxidants, UV stabilizers, and fire retardants may be added to the unmelted second plastic feedstock in the outer extruder 1234. The thermoplastic feedstock and any additives are then mixed and heated above its melting point in the outer extruder 1234. The molten thermoplastic is introduced by the outer extruder 1234 into an outer compounder 1236. Wood particles 610 making up the third wood component are also introduced into the outer compounder 1236 from the metering device 1223. While not used in this embodiment, in alternative embodiments glass fibers or other structural additives may also be added into the compounder for mixing with the thermoplastic and wood particles. The melted thermoplastic and wood particles 610 are compounded in the outer compounder 1236 until the wood particles are encapsulated by the thermoplastic. The outer compounder will typically be insulated or heated to maintain the thermoplastic in a molten state and reduce its viscosity as much as possible, however, the temperature of the materials in the outer compounder 1236 must remain below the ignition temperature of the wood pieces.

The mixture produced in the outer compounder 1236 will become the outer structural member of the two-part composite wood material, however, it must first be applied to the inner structural member (denoted 1240) produced by the continuous press 1232. It will be appreciated that in this embodiment, the inner structural member 1240 is the compressed aligned material 1522 of FIG. 15. To produce the two-part composite material, the inner structural member 1240 and the mixture from the outer compounder 1236 are first delivered to an applicator unit 1242. As will be described in further detail below, several types of apparatus may be used for the applicator unit 1242, including a conventional extruder die unit (FIG. 17), a calender forming roll unit (FIGS. 18a and 18b), or a newly developed coating die unit (FIGS. 19a, 19b, 20a and 20b).

After the outer structural member is applied (or, for the one-part composite wood, after the material exits the continuous press), the material proceeds for final processing. Typically, final processing includes cooling the material, applying surface decoration if desired, and cutting to length. The cooling operation may include running the composite wood material through a water bath 1246 and/or chilled water spray until the thermoplastic material has solidified throughout a majority of the material. Surface decorations, e.g., wood grain patterns, etc., may be applied to the surface of the material using an embossing roll, heated if necessary. The cut-off operation cuts the material to length and maybe accomplished using conventional cut-off technologies. However, it is preferred that a water-proof or water-resistant coating be applied to the "raw" cut end of the material immediately after the cutoff operation to prevent the exposed wood chips from absorbing water from subsequent cooling processes or from subsequent environmental exposure. In one preferred embodiment, a latex-based material is sprayed onto the cut end of the material immediately after cut-off to provide water resistance. It will be appreciated that these and other finishing procedures may be practiced in various orders without departing from the scope of the current invention.

Figure 17:
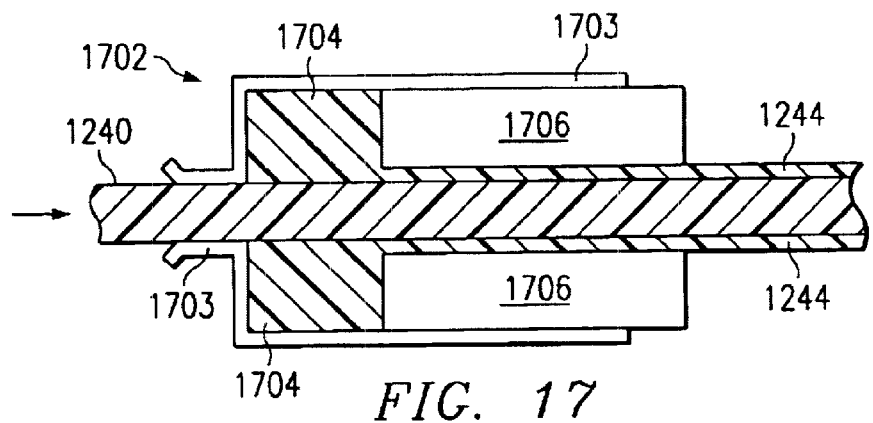
FIG. 17 illustrates an outer profile molder for applying the outer structural member to the inner structural member.

Referring now to FIG. 17, there is illustrated an outer profile molder 1702 of a type suitable for applying the outer structural member to the inner structural member 1240. The outer profile molder 1702 typically includes an inner member retainer tube 1703 for positioning the inner structural member 1240 as it enters the unit. A temperature controlled reservoir cavity 1704 is provided holding a given quantity of the thermoplastic-wood mixture produced in the outer compounder 1236. The outer compounder 1236 must supply the outer mixture to the supply cavity 1704 at a rate sufficient to keep the cavity fall. Adequate pressure must be maintained in the outer profile molder 1702 in order to apply the outer structural member 1244 over the inner structural member 1240. If the compounder 1236 cannot provide sufficient pressure, then a supplemental extruder (not shown) may be required to inject the molten mixture into the outer profile molder. As the inner structural member 1240 passes through the outer profile molder 1702, the surface temperature of the inner structural member is raised, allowing a thermal bond to occur between the thermoplastics of the inner and outer structural members. Adjustable slide gates 1706 may be used to control the flow rate of the outer material as it is applied to each side of the inner structural member 1240. The outer profile molder 1702 utilizes conventional extruder technology to form the two-part thermoplastic composite wood material. The use of this technology is well known, and it works relatively well for the thermoplastic composite wood of this invention where the thickness of the outer structural member 604 is within the range from about 0.010 inch to about 0.040 inch. For thicker coatings, the operating costs tend to be comparatively high, due largely to the fact that typical thermoplastics (e.g., polypropylene) have a relatively high viscosity at temperatures below 400° F. As previously discussed, 400° F. is the approximate temperature at which the wood components in the outer mixture will ignite or break down. Injecting or extruding the highly viscous mixture of (relatively) low temperature molten thermoplastic and wood particles into the outer profile molder 1702 tends to be very energy intensive.

Figure 18A:
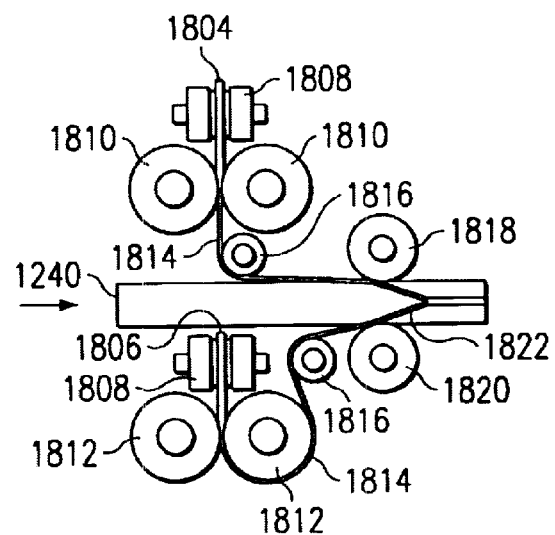
FIGS. 18a and 18b illustrate an alternative applicator unit which utilizes coating rollers to apply the outer structural member to the inner structural member.
Figure 18B:
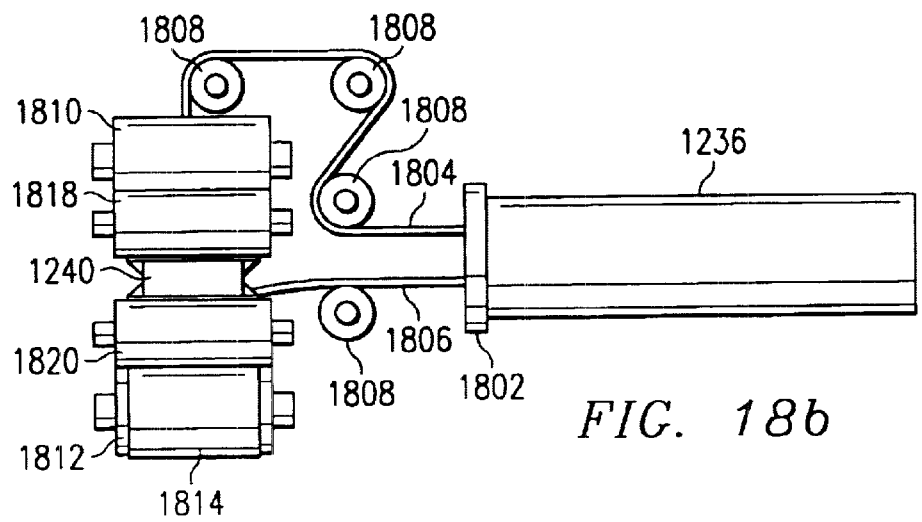

Referring now to FIGS. 18a and 18b, there is illustrated an alternative applicator unit which utilizes coating rollers rather than an outer profile molder to apply the outer structural member 1244 to the inner structural member 1240. In this embodiment, the outer compounder 1236 is equipped with a die plate 1802 which splits the material exiting the compounder into two continuous strands 1804 and 1806. The strands are at a temperature at which they are still melted and flexible, yet able to withstand limited tensile stress. The strands 1804 and 1806 are routed by a series of strand guide rollers 1808 to pairs of closely spaced calender rolls 1810 and 1812. The mixture strands 1804 and 1806 are flattened as they pass between the calender rolls 1810 and 1812, forming a wide, thin film 1814 of outer material. This film 1814 is then routed by a series of film guide rollers 1816 and then pressed onto the upper and lower surfaces of the inner structural member 1240 by application rollers 1818 and 1820. If the film 1814 is initially wider than the inner structural member 1240, then the "overhanging" edges 1822 of the film may be folded down onto the sides of the inner structural member by side rollers (not shown) to completely enclose the inner structural member with the outer structural member. It will be appreciated that the inner and/or outer structural members must be maintained at a temperature sufficient to achieve a thermal bond between the thermoplastics of the inner structural member and the outer structural member. The use of calender forming rolls allows the outer structural member 1244 to be applied at higher throughput rates and with lower energy usage than the conventional extrusion technology represented by the outer profile molder previously discussed.

Figure 19A:
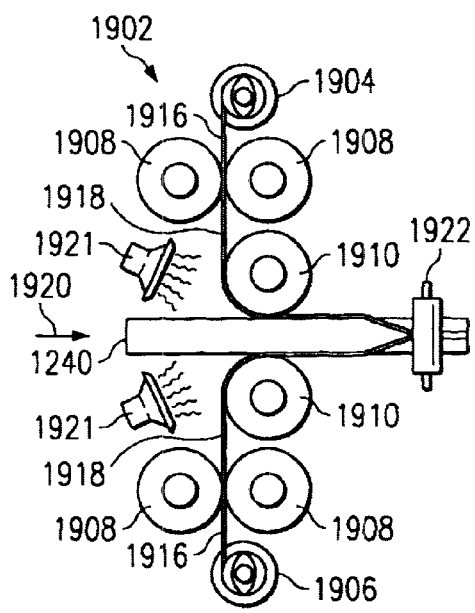
FIGS. 19a and 19b illustrate a coating die unit of a type suitable for applying the outer structural member to the inner structural member, FIG. 19a being an end view thereof and FIG. 19b being a side view thereof.
Figure 19B:
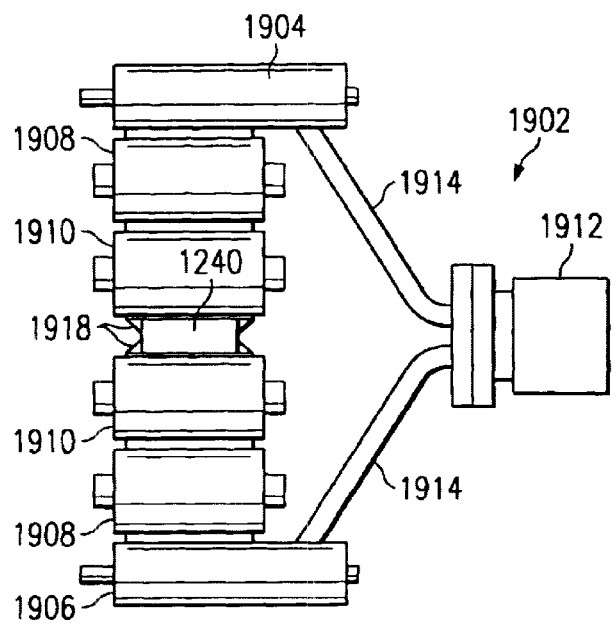

Referring now to FIGS. 19a and 19b there is illustrated yet another type of alternative applicator unit suitable for applying the outer structural member to the inner structural member. The apparatus, called a coating die unit, is also suitable for other applications involving the extrusion of high viscosity materials. The coating die unit 1902 comprises an upper coating die 1904, a lower coating die 1906, calender rollers 1908 and application rollers 1910. Molten material from the outer compounder 1236 (FIG. 12) is supplied to each coating die 1904, 1906 via supply pipes 1914. In some cases, a supplemental boost pump 1912 is provided as shown to increase the flow rate of molten material from the outer compounder 1236 to the coating dies 1904, 1906. A raw sheet 1916 of molten material is dispensed from each coating die. It is significant that each raw sheet 1916 dispensed from the coating die 1904, 1906 has a thickness dimension and a width dimension that are very close to the desired finished dimensions of the sheet. The raw sheet 1916 then passes between calender rolls 1908 which reduce the thickness of the sheet to form a final sheet 1918. The calender rolls are typically heated to bring the temperature of the final sheet 1918 to a temperature sufficient to cause thermal bonding with the inner structural member, e.g., typically about 315° F. to about 320° F. In some embodiments, a supplemental heat source, for example, IR lamp 1921, is provided to specifically heat the surface of the sheet 1918 and the surface of the structural member 1240 just before contact to ensure a good bond. The hot final sheets 1918 are then guided by the application rollers 1910 which press the final sheets against the top and bottom of the inner structural member 1240 as it passes between the rollers in the direction indicated by arrow 1920. The hot sheets 1918 then bond to the top and bottom of the inner structural member 1240. As best seen in FIG. 19b, the final sheet 1918 has a width dimension wider than the width of the inner structural member 1240, such that a portion of the sheet "overhangs" on each side of the inner structural member. A pair of side rollers 1922 or guides folds the overhanging material onto the sides of the inner structural member 1240. The overhanging material from the top sheet is dimensioned to overlap the overhanging material from the bottom sheet when folded down. Thus, as the side rollers press the overlapping material against the side of the inner structural member, the hot material bonds to the inner structural member and to the other sheet, forming a continuous coating of the outer structural member around the inner structural member.

Figure 20A:
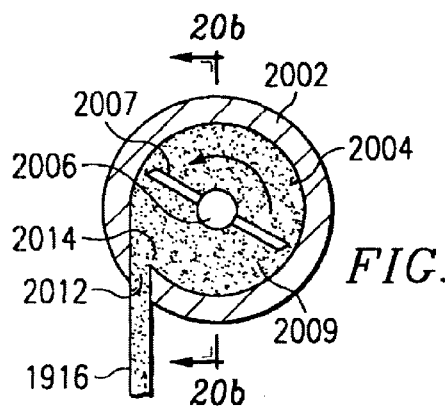
Figure 20B:
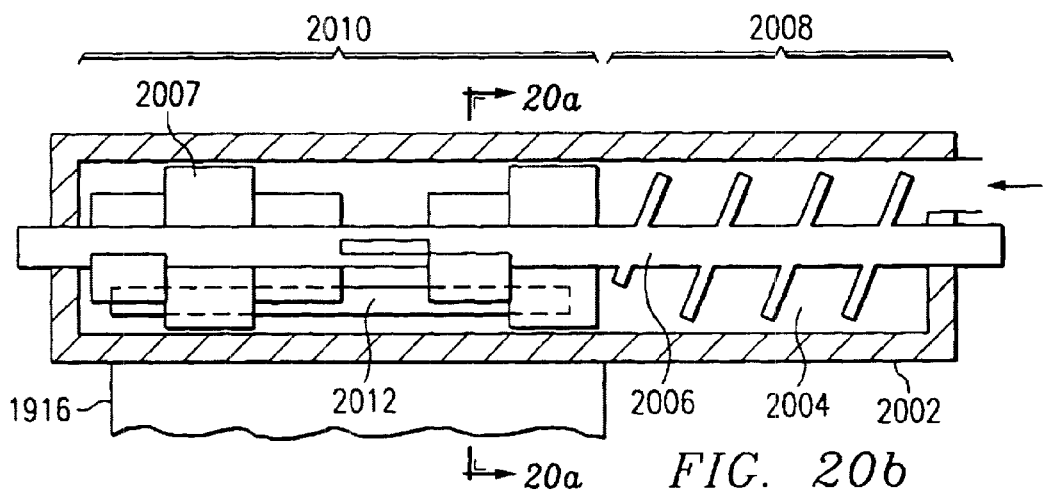

Referring now to FIGS. 20a and 20b, there is illustrated an enlarged view of the upper coating die 1904, it being understood that the lower coating die 1906 is substantially identical. The coating die 1904 includes an exterior casing 2002 which defines a longitudinal cavity 2004. A single shaft 2006 is mounted in each cavity 2004 and rotated by an external power source (not shown). The shaft 2006 is equipped with paddles or screws 2007 thereon which define a feed section 2008 and a dispensing section 2010. The paddles 2007 in the feed section 2008 have a positive pitch that forces the molten material received from the compounder 1236 into the dispensing section 2010 with sufficient force and volume to keep the dispensing section full. A tangentially disposed dispensing slot 2012 is formed through the exterior casing 2002 and extends longitudinally across the dispensing section. The paddles 2007 in the dispensing portion 2010 push the molten material 2009 out of the cavity through the dispensing slot to form the raw sheet 1916 (FIGS. 19a and 19b). Preferably, the paddles 2007 along the shaft 2006 are angularly offset from one another in the dispensing section 2010, as this serves to keep the mixture 2009 moving properly through the coating die. It is significant that the dispensing slot 2012 is formed tangentially through the exterior casing 2002 as shown. As best seen in FIG. 20a, the exposed interior edge 2014 of the slot 2012 serves as a "knife" which continuously slices a sheet of the molten material 2009 from the rotating mass within the coating die. The mechanical cutting of the sheet material in the coating die 1904 is much more energy efficient than forcing the material through a slot with pressure alone, as in conventional extruding technologies.

In one example of this invention, an extruded product will be made from the two-part thermoplastic composite wood material. The finished product will have overall dimensions of 5.50"×1.50" (i.e., nominal 2×6 lumber size) including a 0.125" thick outer structural member that completely surrounds the inner structural member. The raw material feed rates for the inner structural member are as follows: 1064 lbs/hr of dried wood chips having an axial length from about ¾" to about 1-¼" and a width from about ⅛" to about ¼"; 267 lbs/hr of dried wood particles having a diameter from about 0.023" to about 0.033"; and 492 lbs/hr of polypropylene pellets. The dried wood pieces are fed into the inner compounder at a temperature of about 220° F. and the molten polypropylene is fed into the compounder from the extruder at a temperature of about 395° F. This results in an inner compounder exit temperature of about 267° F. The material is dispensed as loose clumps form the inner compounder and compressed in the continuous press to form an inner structural member with a density of about 39.6 lbs/cu. ft. The corresponding raw material feed rates for the outer structural member are as follows: 329 lbs/hr of dried wood particles having a diameter from about 0.023" to about 0.033"; and 402 lbs/hr of polypropylene pellets. The dried wood particles are fed into the outer compounder at a temperature of about 220° F. and the molten polypropylene is fed into the compounder from the outer extruder at a temperature of about 385° F. This results in an outer compounder exit temperature of about 311° F. A coating die is used to dispense the outer material received from the outer compounder. The temperature of the outer material leaving the coating die is still about 311° F. The outer material is heated using the calender rollers of the coating die unit to bring the surface temperature of the sheet to about 320° F. The outer material (at about 320° F) is then applied, i.e., pressed against the inner structural member (still at about 267° F.), causing the inner and outer structural members thermally bond since they both remain in the molten state. The material is then cooled to a final temperature of about 100° F. using a water bath. This process produces approximately 2554 lbs/hr of finished material having an overall density of about 43.8 lbs/cu. ft. It has been determined that melting the thermoplastic components, mixing them with the wood components, and forming the resulting mixture using the processes and apparatus of this invention requires only about 25% of the electrical energy required for melting, mixing and forming the same amounts of material using conventional extrusion technologies. It will be appreciated that this results in a significant savings of electricity, which may be accompanied by a savings in the cost of manufacture.

Although the preferred embodiment has been described in detail, it should be understood that various changes, substitutions and alterations can be made therein without departing from the spirit and scope of the invention as defined by the appended claims.

What is claimed is:

1. A composite material comprising:
   a first wood component of substantially axially aligned wood chips having a first size range and being distributed throughout the composite material in a first discontinuous phase;
   a second wood component of wood particles having a second size range and being distributed between the wood chips in a second discontinuous phase, the second size range being distinct from the first size range and having substantially smaller values than the first size range;
   a thermoplastic polymer component encapsulating the wood chips and the wood particles and forming a continuous phase extending throughout the composite material;
   wherein the wood chips constitute between 100 and 0 weight percent of a total weight of the first and second wood components and the wood particles constitute between 0 and 100 weight percent of the total weight of the first and second wood components;
   wherein the first and second wood components together constitute from about 90 to about 50 weight percent of the composite material; and
   wherein the thermoplastic polymer component constitutes from about 10 to about 50 weight percent of the composite material.

2. A composite material in accordance with claim 1, wherein:
   the wood chips constitute from about 90 to about 65 weight percent of the total weight of the first and second wood components; and
   the wood particles constitute from about 10 to about 35 weight percent of the total weight of the first and second wood components.

3. A composite material in accordance with claim 2, wherein:
   the wood chips constitute from about 85 to about 75 weight percent of the total weight of the first and second wood components; and
   the wood particles constitute from about 15 to about 25 weight percent of the total weight of the first and second wood components.

4. A composite material in accordance with claim 1, wherein:
   the first and second wood components together constitute from about 80 to about 65 weight percent of the composite material; and
   the thermoplastic polymer component constitutes from about 20 to about 35 weight percent of the composite material.

5. A composite material in accordance with claim 4, wherein:
   the first and second wood components together constitute from about 77 to about 70 weight percent of the composite material; and
   the thermoplastic polymer component constitutes from about 23 to about 30 weight percent of the composite material.

6. A composite material in accordance with claim 1, wherein the first size range includes wood chips having an axial length from about ¼ inch to about 2 inches and a width from about 1/16 inch to about ¾ inch.

7. A composite material in accordance with claim 6, wherein the second size range includes wood particles having a diameter from about 0.010 inch to about 0.076 inch.

8. A composite material in accordance with claim 6, wherein the first size range includes wood chips having an axial length from about ¼ inch to about 1-½ inches and a width from about 1/16 inch to about ¼ inch.

9. A composite material in accordance with claim 8, wherein the second size range includes wood particles having a diameter from about 0.016 inch to about 0.046 inch.

10. A composite material in accordance with claim 8, wherein the first size range includes wood chips having an axial length from about ¾ inch to about 1-¼ inches and a width from about ⅛ inch to about ¼ inch.

11. A composite material in accordance with claim 10, wherein the second size range includes wood particles having a diameter from about 0.023 inch to about 0.033 inch.

12. A composite material in accordance with claim 1 having a density from about 30 pounds per cubic foot to about 50 pounds per cubic foot.

13. A fencing product formed of a composite material in accordance with claim 1.

14. A decking product formed of a composite material in accordance with claim 1.

15. A composite material comprising:
   an inner structural member including:
      a first wood component of substantially axially aligned wood chips having a first size range and being distributed throughout the inner structural member in a first discontinuous phase;
      a second wood component of wood particles having a second size range and being distributed between the wood chips in a second discontinuous phase, the second size range being distinct from the first size range and having substantially smaller values than the first size range;
      a first thermoplastic polymer component encapsulating the wood chips of the first wood component and the wood particles of the second wood component and forming a first continuous phase extending throughout the first structural member;
      wherein the first and second wood components together constitute from about 90 to about 50 weight percent of the inner structural member; and
      wherein the first thermoplastic polymer component constitutes from about 10 to about 50 weight percent of the inner structural member; and
   an outer structural member being continuously joined to the inner structural member and including:
      a third wood component of wood particles having a third size range and being distributed throughout the outer structural member in a third discontinuous phase;

a second thermoplastic polymer component encapsulating the wood particles of the third wood component and forming a second continuous phase extending throughout the outer structural member;

wherein the third wood component constitutes from about 10 to about 50 weight percent of the outer structural member; and wherein the second thermoplastic polymer component constitutes from about 90 to about 50 weight percent of the outer structural member.

16. A composite material in accordance with claim 15, wherein:

the first size range includes wood chips having an axial length from about ¼ inch to about 2 inches and a width from about 1/16 inch to about ¾ inch;

the second size range includes wood particles having a diameter from about 0.010 inch to about 0.066 inch; and the third size range includes wood particles having a diameter from about 0.010 inch to about 0.076 inch.

17. A composite material in accordance with claim 15, wherein:

the inner structural member has a density from about 30 pounds per cubic foot to about 50 pounds per cubic foot; and the outer structural density from about 50 pounds per cubic foot to about 80 pounds per cubic foot.

18. A composite material in accordance with claim 15, wherein the outer structural member, when viewed in axial cross section, completely encloses the inner structural member.

19. A fencing product formed of a composite material in accordance with claim 18.

20. A decking product formed of a composite material in accordance with claim 18.

21. A composite material in accordance with claim 15, wherein the outer structural member, when viewed in axial cross section, is contiguous with one or more edges of the inner structural member.

* * * * *